United States Patent [19]

Nishiyama

[11] Patent Number: 5,328,248
[45] Date of Patent: Jul. 12, 1994

[54] SEAT FRAME FOR A VEHICLE

[75] Inventor: Kunio Nishiyama, Sosono, Japan

[73] Assignee: Toyota Jidosha Kabushiki Kaisha, Toyota, Japan

[21] Appl. No.: 915,613

[22] Filed: Jul. 21, 1992

[30] Foreign Application Priority Data

Jul. 23, 1991 [JP] Japan ............................ 3-182435
Jul. 23, 1991 [JP] Japan ............................ 3-182436

[51] Int. Cl.⁵ .................................... A47C 7/02
[52] U.S. Cl. .................... 297/452.56; 297/452.18
[58] Field of Search ............. 297/452, 441, 443, 218, 297/216

[56] References Cited

U.S. PATENT DOCUMENTS

| | | | |
|---|---|---|---|
| 3,289,220 | 12/1966 | Grimshaw | 297/452 |
| 3,329,466 | 7/1967 | Getz | 297/452 |
| 4,037,829 | 7/1977 | Crosby | 297/452 |
| 4,147,336 | 4/1979 | Yamawaki | 297/452 |
| 4,509,796 | 4/1985 | Takagi | 297/452 |
| 4,695,097 | 9/1987 | Muraishi | 297/452 |
| 4,834,458 | 5/1989 | Izumida | 297/452 |
| 4,861,104 | 8/1989 | Malak | 297/218 |
| 4,863,219 | 9/1989 | Ochiai | 297/443 |
| 5,013,089 | 5/1991 | Abu-Isa | 297/452 |

FOREIGN PATENT DOCUMENTS

| | | |
|---|---|---|
| 62-111227 | 7/1987 | Japan . |
| 62-111228 | 7/1987 | Japan . |
| 179474 | 5/1962 | Sweden .............. 297/218 |

Primary Examiner—Flemming Saether
Attorney, Agent, or Firm—Cushman, Darby & Cushman

[57] ABSTRACT

A front-lower arm portion is disposed in the forward direction of a vehicle, while a rear-lower arm portion is disposed in the rearward direction of the vehicle. The rear-lower arm portion is formed of a material having greater tensile strength and compressive strength than that of the front-lower arm portion. A rear end portion of the front-lower arm portion is overlaid with a front end portion of the rear-lower arm portion, thereby securing both end portions together by means of a rivet.

21 Claims, 13 Drawing Sheets

SEAT FRAME FOR A VEHICLE

BACKGROUND OF THE INVENTION

1. Field of the Invention

The present invention relates to a vehicle seat for automobiles and the like.

2. Description of the Related Art

Japanese Utility Model Application Laid-Open No. 62-111227 discloses one example of a conventional vehicle seat which is provided in automobiles and the like.

Referring to FIG. 5, a vehicle seat 70 has an upper arm 72 and a lower arm 74, each of which is formed from a press-formed iron product. An upper rail 76 of a seat track 80 is fixed to the underside of the lower arm 74 by means of unillustrated rivets or the like. A lower rail 78 of the seat track 80 is anchored to a vehicle floor (not shown) via brackets 81. A locking bracket 82 is secured by rivets 84 to a substantially central portion of the upper rail 76 in the longitudinal direction of the upper rail 76.

As illustrated in FIG. 6, an anchoring portion 86 of a seat belt is mounted to the lower arm 74 by portion of a weld bolt 73 and a nut 75, at which location a reinforcing member 88 is fixed by welding and the like for reinforcement. As shown in FIG. 5, the lower arm 74 is bolted to brackets 92 and 94 by means of bolts 96 at two points near both end portions of the lower arm 74 in the longitudinal direction of the lower arm 74. The brackets 92 and 94 are disposed near both end portions of a cushion frame 90 in the longitudinal direction of the cushion frame 90.

However, the vehicle seat 70 has a disadvantage in that the lower arm 74 is heavy because it is formed from a one-piece press-formed iron product. In order to overcome the disadvantage, a possible construction can be formed in which the lower arm 74 is integrally formed of any light metal such as aluminum, which is lighter than iron. Nevertheless, this structure still has an inconvenience in that the strength of the lower arm 74 is too low to sufficiently transmit a load from the lower arm 74 to the vehicle floor.

SUMMARY OF THE INVENTION

In view of the above-described fact, an object of the present invention is to provide a vehicle seat in which a load imposed on a lower arm can be transmitted to a vehicle floor satisfactorily and a lightweight lower arm is achievable.

According to the present invention, the vehicle seat comprises: a front-lower arm portion; and, a rear lower arm portion, which is formed of a material having greater tensile strength and compressive strength than the front-lower arm portion, the rear-lower arm portion being overlaid with the front-lower arm portion so as to be fixed jointly thereto.

With the above structure according to the present invention, a load imposed on the lower arm of the vehicle seat falls into three major categories: a load acting in the rearward direction of the lower arm, which is imparted from a seat back; a tensile load, which is imparted from a seat belt; and, a load acting in the downward direction of the lower arm, which is imparted by an occupant's body weight. These loads are imposed chiefly to the rear-lower arm portion and are then transmitted to the vehicle floor. The rear-lower arm portion is formed of a material such as an iron plate, which has greater tensile strength and compressive strength than the front-lower arm portion. As a result, the strength of the rear portion of the lower arm is increased such that the rear portion of the lower arm is able to sufficiently transmit a load to the vehicle floor. In addition, the front portion of the lower arm is a lightweight member made of, for example, light metal such as aluminum, which has a relatively low degree of tensile strength and compressive strength. As a result, the overall weight of the lower arm can decrease to provide a lightweight lower arm.

Furthermore, a seat back used by the present invention comprises: a seat back frame, which is integrally cast-formed and is fixed to the rear-lower arm portion so as to support an occupant; and, a woven spring member, which is formed of elastic fibers and is anchored to the seat back frame. In addition, the seat back frame comprises: a vertical wall portion, which extends along the outer periphery of the seat back frame; a plurality of spring-mounting members, which are provided inside the vertical wall portion so as to hold the woven spring member against the spring-mounting members; a working hole, which is punched between the vertical wall portion and the spring-mounting member so as to mount the woven spring member to the seat back frame; and, a reinforcing member, which increases the strength of the spring-mounting member.

According to the seat back with the above structure, a bar-shaped member such as an end portion of a screw driver is held against the working hole which is punched in the reinforcing member. With the bar-shaped member used as a fulcrum, a hooking portion on the woven spring member can be held against an interlocking member which is mounted to a spring-mounting seat. This step can provide improved operation in the combining of the woven spring member with the seat back frame. Furthermore, in the seat back frame, the spring-mounting seat and the vertical wall portion are connected together by the reinforcing member, thereby allowing the spring-mounting members on the seat back frame to have greater strength.

DESCRIPTION OF THE PREFERRED EMBODIMENTS

A first embodiment of a vehicle seat according to the present invention will now be described with reference to FIGS. 1 to 4.

Figure 1:
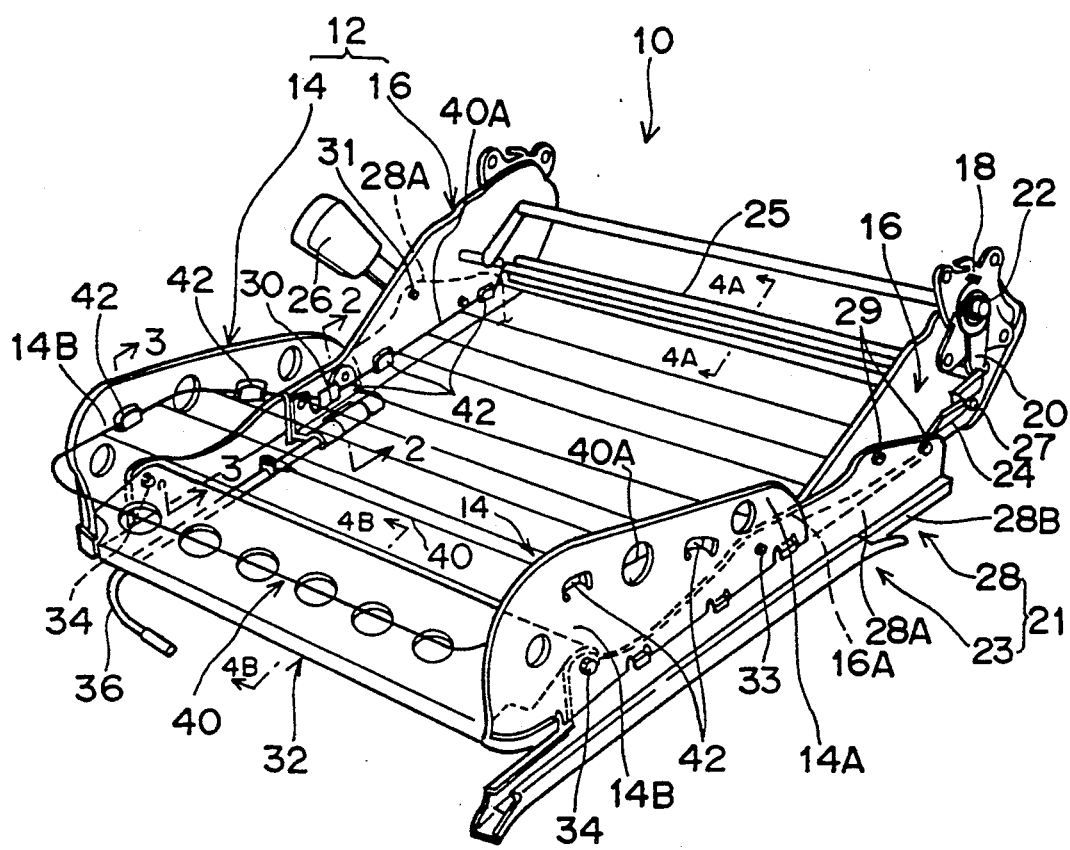
FIG. 1 is a perspective view as diagonally viewed from the front of a seat track of a vehicle seat according to a first embodiment of the present invention, showing an assembled state of the seat track.

Referring to FIG. 1, each lower arm 12 for a vehicle seat 10 according to the first embodiment is formed with: a front-lower arm portion 14, which forms a front portion of the lower arm 12; and, a rear-lower arm portion 16, which forms a rear portion of the lower arm 12. the rear-lower arm portion 16 is a member such as a press-formed iron plate, which has relatively great tensile strength and compressive strength. The front-lower arm portion 14 is a relatively lightweight member, for example, a press-formed product of light metal such as aluminum.

At a rear end portion of the rear-lower arm portion 16, components such as a ratchet 18, a pole 20, a spring 22, and a handle 24 are mounted to functionally serve as a reclining mechanism. A rear-reinforcing member 25 is formed of an aluminum-extruded material. Both end portions of the rear-reinforcing member 25 are bolted by bolts 27 to lower points of the rear end portions of the rear-lower arm portions 16 which are disposed at both sides of the vehicle seat 10. The rear-reinforcing member 25 thereby spans the rear end portions of both of the rear-lower arm portions 16.

A lower end portion of the rear-lower arm portion 16 is fixed by rivets 29 to a vertical wall portion 28A of an upper rail 28. The upper rail 28 and a lower rail 23 form a seat track 21. A base portion 28B of the upper rail 28 is swingably held against the lower rail 23 which is anchored to an unillustrated vehicle floor. On the rear-lower arm portion 16 which is disposed at the right of the vehicle seat 10, a lap belt 26 is mounted at a substantially central portion of the rear-lower arm portion 16 in the longitudinal direction of the vehicle seat 10. A lower end portion of the lap belt 26 is secured jointly to the vertical wall portion 28A of the upper rail 28 and the rear-lower arm portion 16 by means of a bolt 31.

A front end portion 16A of the rear-lower arm portion 16 reaches to a substantially central portion of the lower arm 12 in the longitudinal direction of the vehicle seat 10. A rear end portion 14A of the front-lower arm portion 14 extends to the same portion of the lower arm 12. The rear end portion 14A of the front-lower arm portion 14 is thereby overlaid with an outer side of the front end portion 16A of the rear-lower arm portion 16 in the transverse direction of the vehicle seat 10.

Figure 2:
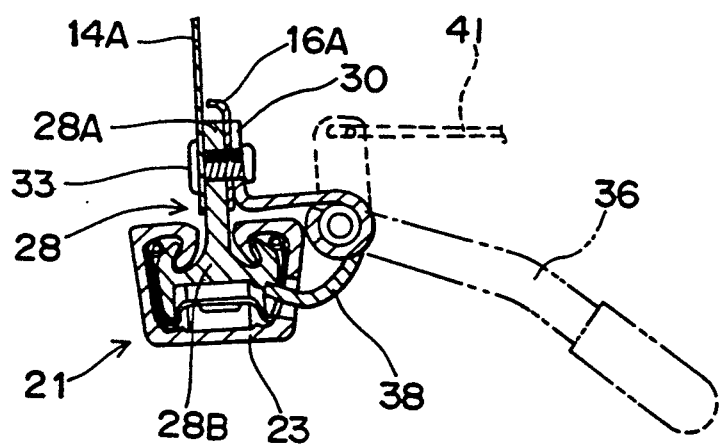
FIG. 2 is a cross-sectional view taken along line 2—2 of FIG. 1.
Figure 3:
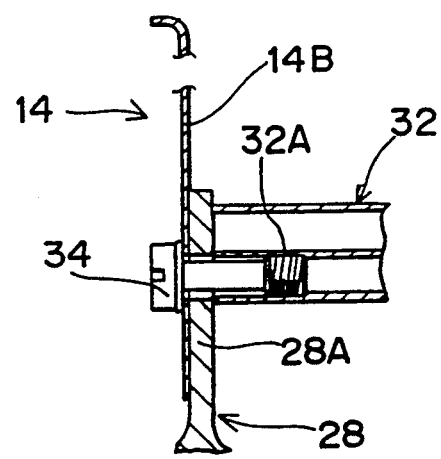
FIG. 3 is a cross-sectional view taken along line 3—3 of FIG. 1.

As shown in FIG. 2, the vertical wall portion 28A of the upper rail 28 is interposed between the front end portion 16A of the rear-lower arm portion 16 and the rear end portion 14A of the front-lower arm portion 14. A locking bracket 30 is held against an inner surface (toward the right in FIG. 2) of the front end portion 16A of the rear-lower arm portion 16. The front end portion 16A of the rear-lower arm portion 16, the rear end portion 14A of the front-lower arm portion 14, the vertical wall portion 28A of the upper rail 28, and the locking bracket 30 are secured together by a rivet 33.

Reference numbers 36, 38, and 41 in FIG. 2 represent a slide handle, a locking plate, and a seat track-equalizing wire respectively.

As illustrated in FIG. 1, a lower portion of the front-lower arm portion 14 is overlaid with an outer side of the vertical wall portion 28A of the upper rail 28 in the transverse direction of the vehicle seat 10. A front-reinforcing member 32, which is formed of an aluminum-extruded material, spans between front portions 14B of the front-lower arm portions 14 which are disposed at both sides of the vehicle seat 10. As can be seen from FIG. 3, one end of the front-reinforcing member 32 is secured by a bolt 34 jointly to the front portion 14B of the front-lower arm portion 14 and the vertical wall portion 28A of the upper rail 28. The front-reinforcing member 32 and the rear-reinforcing member 25 have respective bolted portions 32A and 25A (the latter being unillustrated). The bolted portions 32A and 25A are hollow at the time of extrusion molding; however, a threaded portion is then formed around an inner surface of each of the bolted portions 32A and 25A by way of after-processing.

Figure 4A:
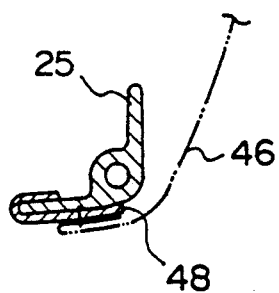
FIG. 4A is a cross-sectional view taken along the line 4A—4A of FIG. 1, illustrating a lower end portion of a rear-reinforcing portion for the vehicle seat according to the first embodiment of the present invention.
Figure 4B:
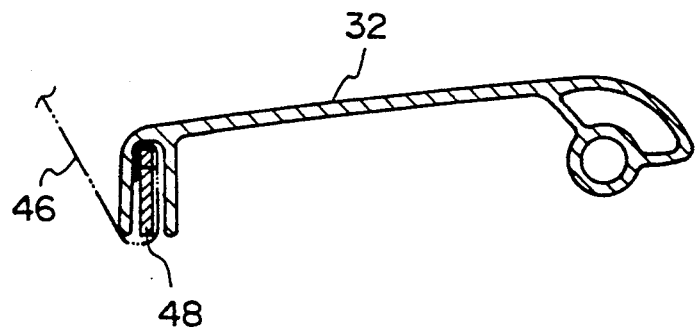
FIG. 4B is a cross-sectional view taken along the line 4B—4B of FIG. 1, showing a lower end portion of a front-reinforcing member for the vehicle seat according to the first embodiment of the present invention.

As shown in FIG. 1, the lower arms 12 disposed at both sides of the vehicle seat 10 are connected together via the front-reinforcing member 32 and the rear-reinforcing member 25, thereby forming a frame structure. Referring to FIG. 4A and FIG. 4B, a lower end portion of the rear-reinforcing member 25 is processed to form a planar surface having a small cross-section in thickness. A lower end portion of the front-reinforcing member 32 is processed to form a groove having a substantially U-shaped cross-section. With this treatment, hooking members 48, which are fixed at both terminal end portions of a seat cover 46, can be anchored to the respective end portions of the rear-reinforcing member 25 and the front-reinforcing member 32. Furthermore, as seen from FIG. 1, cut-out-uprising portions 42 are provided in a predetermined place on respective inner surfaces of the front-lower arm portion 14, the rear-lower arm portion 16, and the locking bracket 30. A frame portion 40A for seat springs 40 is held against the cut-out-uprising portions 42.

The operations of the present embodiment will now be described.

With the above structure according to the present embodiment, a load imposed on the lower arm 12 of the vehicle seat 10 falls into three major categories: a load acting in the rear direction of the lower arm 12, which is imparted from a seat back via a reclining mechanism; a tensile load, which is imparted from a seat belt via the lap belt 26; and, a load acting in the downward direction of the lower arm 12, which is imparted by an occupant's body weight via the seat springs 40. These loads are imparted chiefly to a rear portion of the lower arm 12, i.e., the rear-lower arm portion 16, and are then transmitted to a vehicle floor. The rear-lower arm portion 16, which is an iron plate member, thus acquires greater tensile strength and compressive strength, thereby allowing a load imposed on the rear-lower arm portion 16 to be transmitted to the vehicle floor satisfactorily. In addition, a front portion of the lower arm 12, i.e., the front-lower arm portion 14 is less sensitive to the above-described loads, and is formed of a light metal such as aluminum which has less tensile strength and compressive strength. The overall weight of the lower arm 12 can thereby be lessened to achieve a lightweight lower arm 12.

Figure 5:
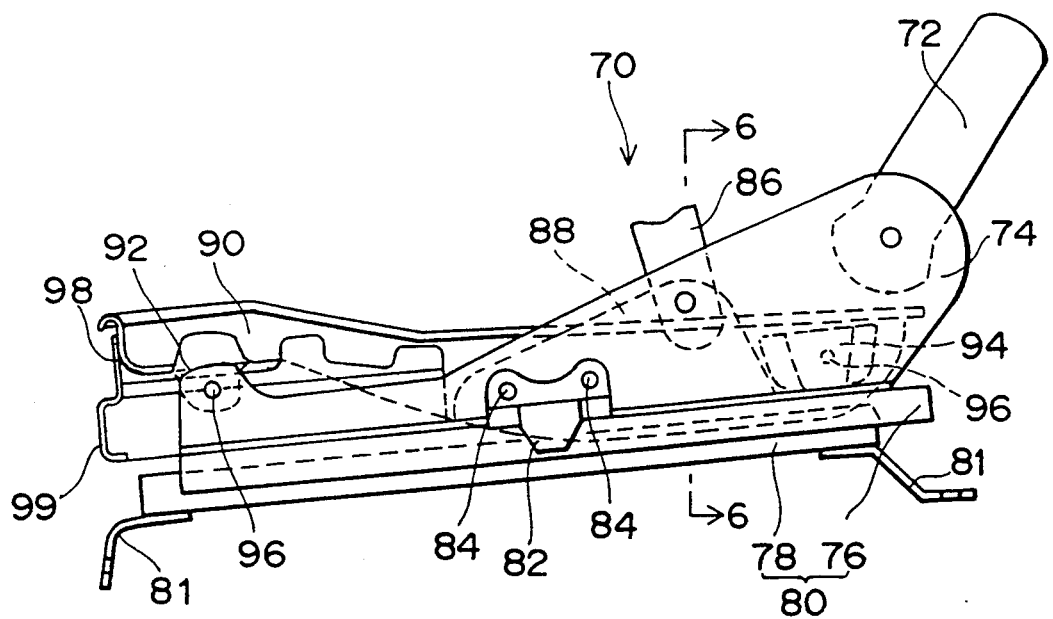
FIG. 5 is a side view illustrating an assembled state of a seat track for a conventional vehicle seat.
Figure 6:
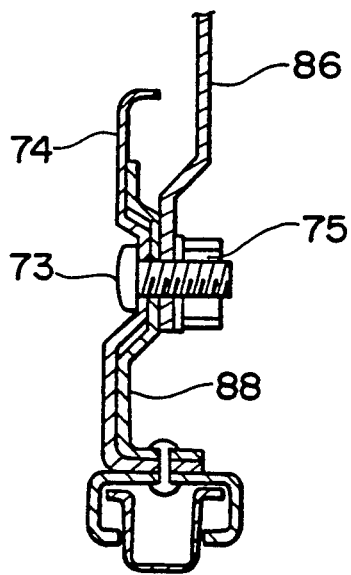
FIG. 6 is a cross-sectional view taken along line 6—6 of FIG. 5.

Furthermore, according to the present embodiment, the vertical wall portion 28A of the upper rail 28 extends upward so as to be fixed directly to the front-lower arm portion 14, the rear-lower arm portion 16, the front-reinforcing member 32, and the rear-reinforcing member 25 by means of rivets 33 and 29 and bolts 34 and 27. As a result, an entire outline of these members is formed into a rectangular shape, thereby allowing conventional cushion frames to be eliminated. Furthermore, a conveniently assembled structure is achieved by a step of bolting the front-reinforcing member 32 and the rear-reinforcing member 25 to adjacent members thereof. In addition, according to the present embodiment, the respective end portions of the front-reinforcing member 32 and the rear-reinforcing member 25 are processed to form a groove having a substantially U-shaped cross-section or a planar surface having a small cross-section in thickness. Both terminal end portions of a seat cover can thereby be fixed to the respective end portions of the front-reinforcing member 32 and the rear-reinforcing member 25. This processing eliminates a cover-setting plate 99 for fixing a terminal end portion of a seat cover, as shown in FIG. 5, which is provided in conventional constructions. As a consequence, a lightweight product which has greatly fewer components and involves less cost is now achievable.

The above structure according to the present invention provides improved operations in which a load imparted on the lower arm can sufficiently be transmitted to the vehicle floor. A lighter lower arm can also be attained.

Next, a seat back used on the vehicle seat according to the present invention will be described with reference to FIGS. 7A to 10.

Figure 7A:
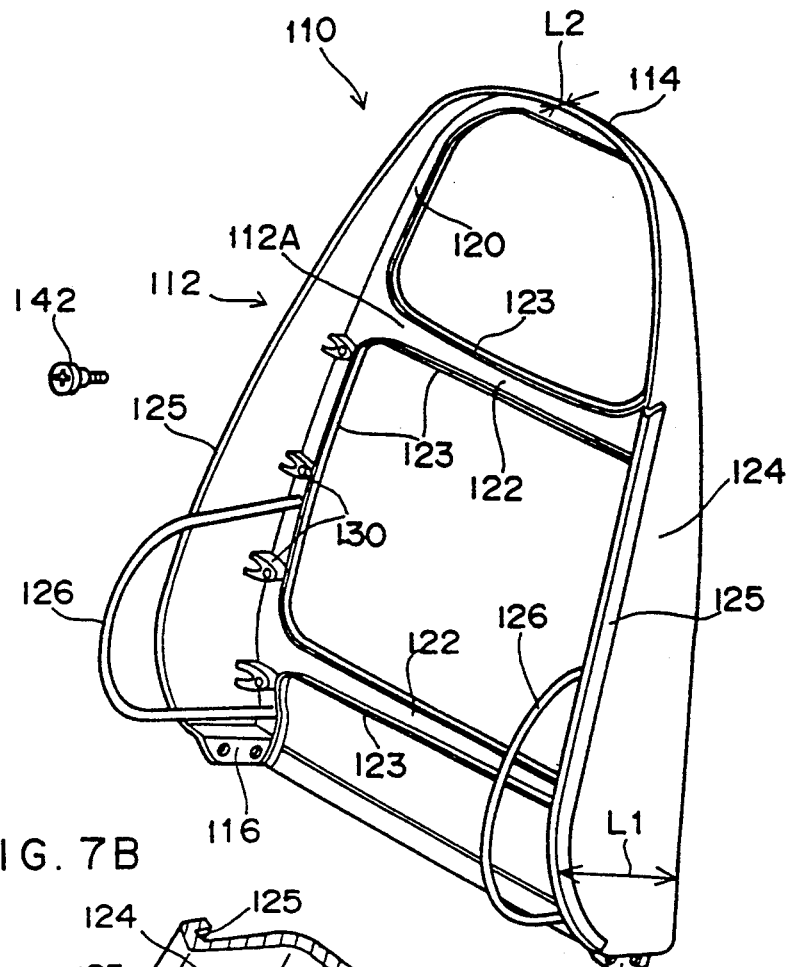
FIG. 7A is a perspective view seen diagonally from the front of a seat back frame, which is used by the vehicle seat according to a second embodiment of the present invention.

Referring to FIG. 7A, a seat back frame 112 used on a seat back 110 of the vehicle seat according to the present embodiment is a high-back type, provided with a head restraint portion 114. The seat back frame 112 is molded out of metal including aluminum, magnesium, etc., by casts such as a die cast or the like.

A pair of reclining mechanism-mounting portions 116 are provided at opposite lower-end portions of the seat back 110 in the transverse direction of the seat back 110. Each of the reclining mechanism-mounting portions 116 has mounting holes 118 for the insertion of bolts and nuts, both of which are unillustrated. The seat back 110 is mounted to a reclining mechanism (not shown) which is disposed at a rear portion of an unillustrated seat cushion by means of the above-noted bolts and nuts.

A base portion 112A of the seat back frame 112, which supports the head, back, and waist of an occupant, includes: a frame portion 120; and, a plurality of beam portions 122, which span between opposite sides of the frame portion 120 in the transverse direction of the seat back 110. A vertical wall portion 124, which protrudes in the forward direction of the seat back 110, is formed on the outer periphery of the frame portion 120. Flanges 123 are formed along edge portions of the beam portions 122 on the inner periphery of the frame portion 120. Without interruption, the flanges 123 project at a substantially constant height in the forward direction of the seat back 110. The height L of the vertical wall portion 124 increases steeply at successively greater distances toward the head restraint portion 114 from the reclining mechanism-mounting portion 116. The vertical wall portion 124 then achieves its maximum height L1 at a location thereof which represents the waist of an occupant. Thereafter, height L gradually lessens as the head restraint portion 114 is approached. When the head restraint portion 114 is reached, height L is at minimum L2.

Figure 8:
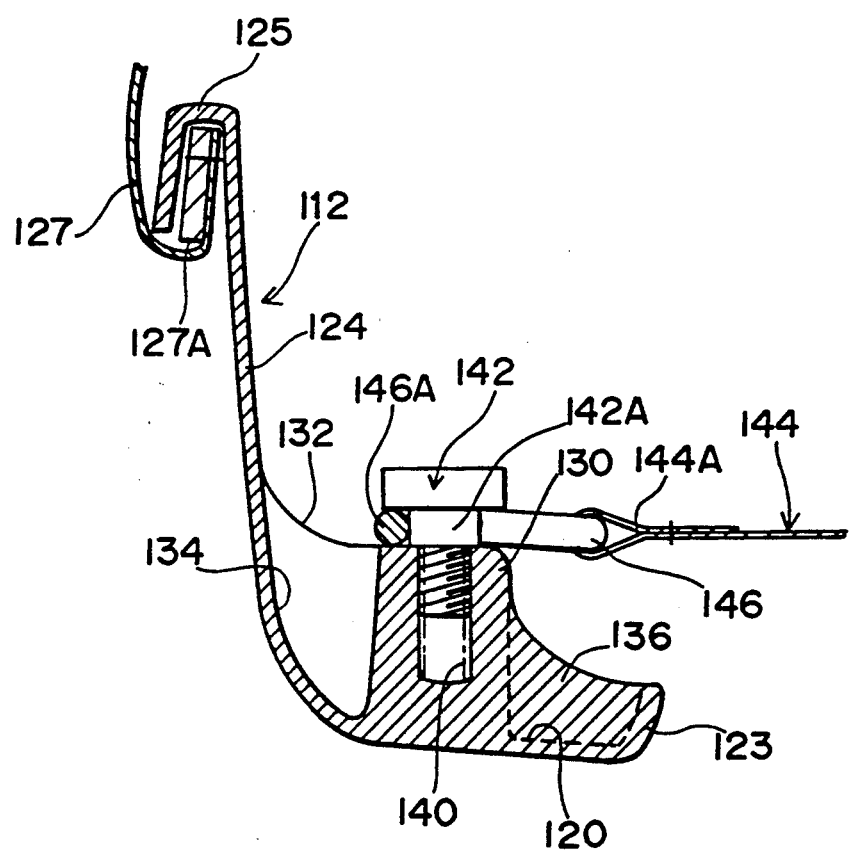
FIG. 8 is a cross-sectional view of a seat back frame showing a state of mounting a woven spring member to the seat back frame.

A pair of cover-fixing grooves 125 are formed on portions of the vertical wall portion 124 of the seat back frame 112 other than the head restraint portion 124. The cover-fixing groove 125 is formed by an end portion of the vertical wall portion 124 being bent into a U-shape in an outward direction of the seat back frame 112. As shown in FIG. 8, a plate-shaped interlocking strip 127A, which is secured to an end portion of a cover 127 for the seat back 110, is held against the cover-fixing groove 125.

Referring back to FIG. 7A, a side frame 126 is integrally formed with the seat back frame 112 in the vicinity of maximum height L1 of the vertical wall portion 124. The side frame 126 is of a lateral U-shape when viewed from the side thereof, with a curved portion of the side frame 126 directed in the forward direction of the seat back 110.

Figure 11:
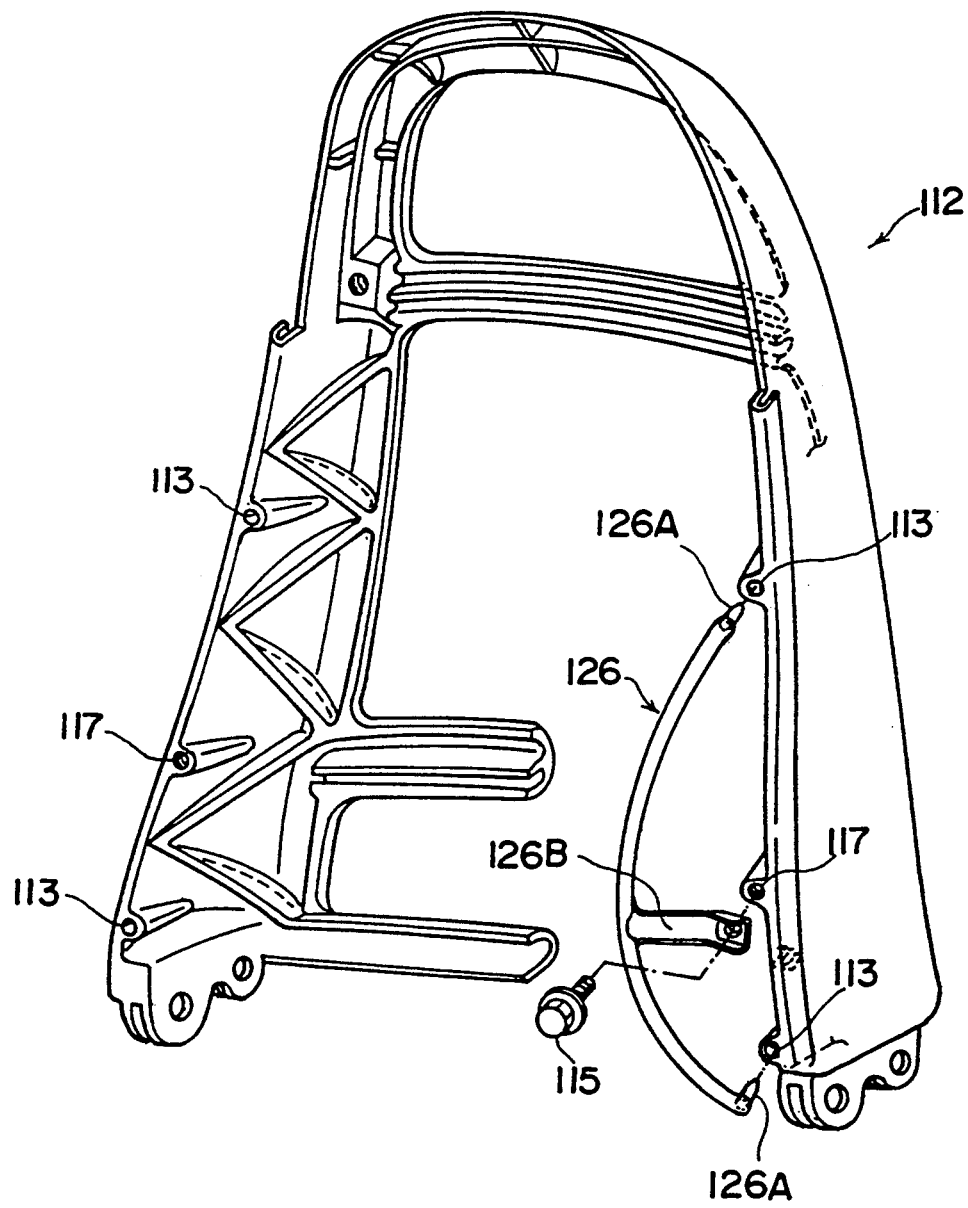
FIG. 11 is a perspective view seen diagonally from the front of a seat back frame of a vehicle seat according to another embodiment of the present invention.
Figure 12:
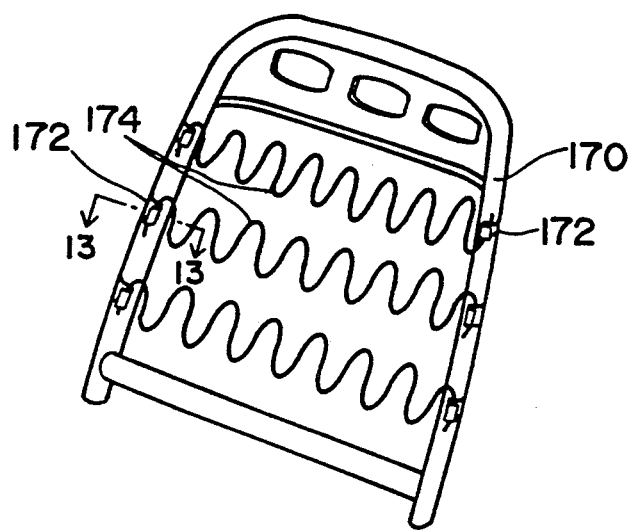
FIG. 12 is a perspective view seen diagonally from the front of a seat back frame of a conventional vehicle seat.
Figure 13:
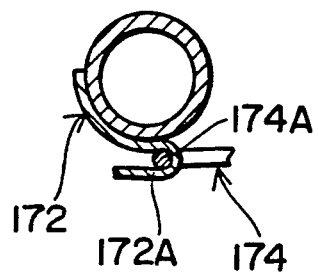
FIG. 13 is a cross-sectional view taken along line 13—13 of FIG. 12.

In addition, as illustrated in FIG. 11, the side frame 126 may also be separable from the seat back frame 112. In this case, the side frame 126 is formed as a bar member made of metal such as aluminum or magnesium. Pins 126A are formed at opposite end portions of the side frame 126 so as to be inserted through mounting holes 113 which are provided in the seat back frame 112. An end portion of a mounting leg 126B, which extends from a substantially central portion of the side frame 126, is then bolted into a threaded hole 117 of the seat back frame 112 by means of a bolt 115.

Referring back to FIG. 7A, a plurality of spring-mounting seats 130 are provided on the frame portion 120 of the base portion 112A of the seat back frame 112. Being spaced at predetermined intervals along the vertical wall portion 124, the spring-mounting seats 130 are formed on portions of the seat back frame 112 other than the head restraint portion 114. The spring-mounting seats 130 are integrally formed with the seat back frame 112.

Figure 7B:
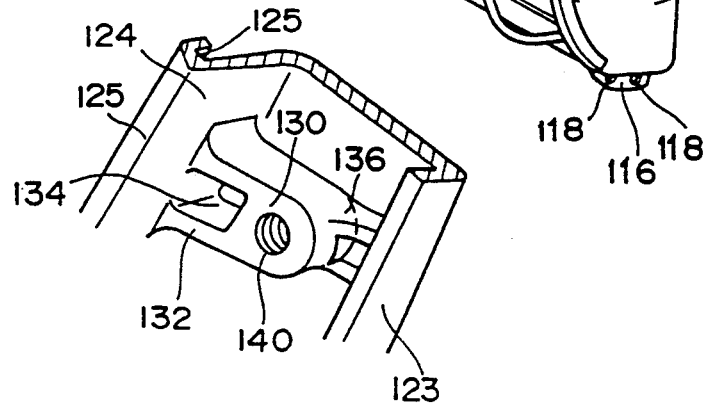
FIG. 7B is a partially partial cross-sectional perspective view of a seat back frame shown in of FIG. 7A.

As can be seen from FIG. 7B, a bolt hole 140 is located at a substantially central portion of the spring-mounting seat 130. A threaded portion is formed around a inner circumferential surface of the bolt hole 140. As shown in FIG. 8, a fluted bolt 142 is engaged into the threaded portion.

Figure 9:
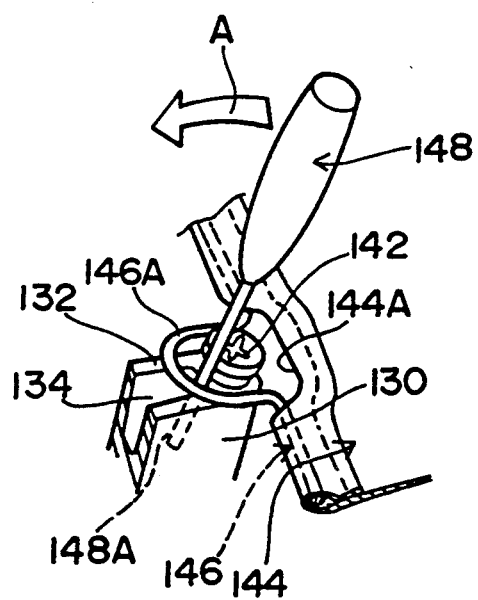
FIG. 9 is a descriptive illustration for mounting a woven spring member to the seat back frame, which is used by the vehicle seat according to the second embodiment of the present invention.
Figure 10:
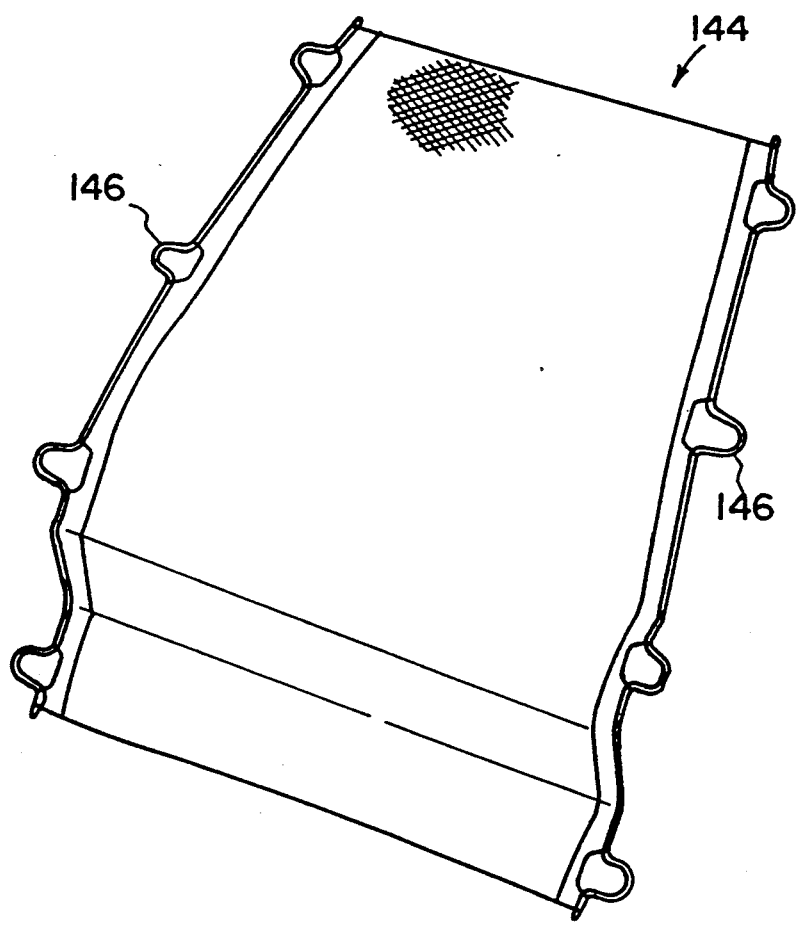
FIG. 10 is a perspective view seen diagonally from the front of the woven spring member of the vehicle seat according to the second embodiment of the present invention.

As illustrated in FIG. 10, a seat back cushion member is formed by using elastic fibers, as a woven spring member 144. At each end portion of the woven spring member 144 in the transverse direction thereof, a spring-mounting bracket 146, which is made of a hard steel wire, is mounted thereto by way of stitching or welding. Referring to FIG. 9, the spring-mounting bracket 146 is provided with an interlocking portion 146A, which is bent into a U-shape at a predetermined distance in a direction opposite from the woven spring member 144. A portion of the woven spring member 144, which is opposite the interlocking portion 146A, is clipped in a rectangular form in a direction opposite from the interlocking portion 146A, thereby forming a notched portion 146A. In addition, as shown in FIG. 8, the interlocking portion 146A of the spring-mounting bracket 146 is held against a fluted portion 142A of the fluted bolt 142.

As illustrated in FIG. 8, a first hub portion 132 is integrally formed with the spring-mounting seat 130 and the vertical wall portion 124 so as to connect therebetween. The first hub portion 132 thereby serves as a reinforcing member. The first hub portion 132 has an arc-shaped cross-section which draws a gradually convex curve in the downward direction of the seat back frame 112. Referring to FIG. 7B, a working hole 134 is punched at a substantially central portion of the first hub portion 132. The working hole 134 has a concave portion having a rectangular cross-section. In addition, a second hub portion 136 is integrally formed with the spring-mounting seat 130 and a flange 123 so as to connect therebetween.

Next, the operation of the seat back in the present embodiment will be described.

Referring to FIG. 9, according to the present aspect of the above-described structure, a bar-shaped member such as an end portion 148A of a screw driver 148 is inserted through the interlocking portion 146A of the spring-mounting bracket 146 of the woven spring member 144. The end portion 148A of the screw driver 148 is further inserted into the working hole 134 of the first hub portion 132 so as to be held against the working hole 134. In this state (as illustrated in FIG. 9), the screw driver 148 is rotated in an outward direction of the seat back frame 112 (in a direction of arrow A), with the end portion 148A of the screw driver 148 used as a fulcrum. As shown in FIG. 8, the interlocking portion 146A of the spring-mounting bracket 146 can thereby be easily held against the fluted portion 142A of the fluted bolt 142, which is screwed in the spring-mounting seat 130, independently of a tensile force from the woven spring member 144. This step provides improved operativity in the combining of the woven spring member 144 with the seat back frame 112.

In addition, in the seat back frame 112, the spring-mounting seat 130 and the vertical wall portion 124 are connected together by the first hub portion 132, thereby allowing the spring-mounting seat 130 on the seat back frame 112 to acquire greater strength.

Figure 14:
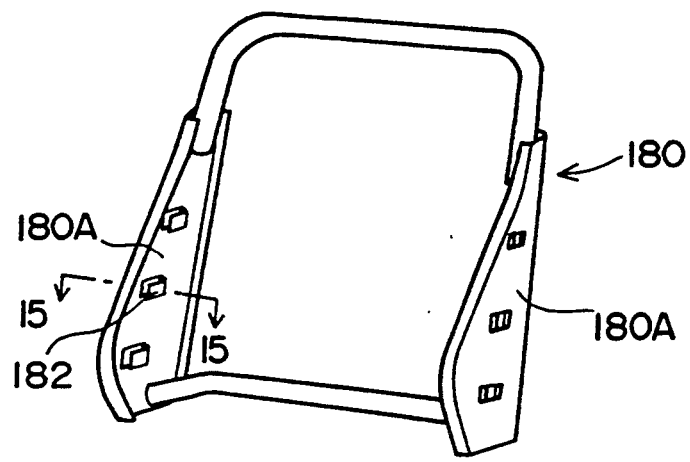
FIG. 14 is a perspective view seen diagonally from the front of a seat back frame for another type of a conventional vehicle seat.
Figure 15:
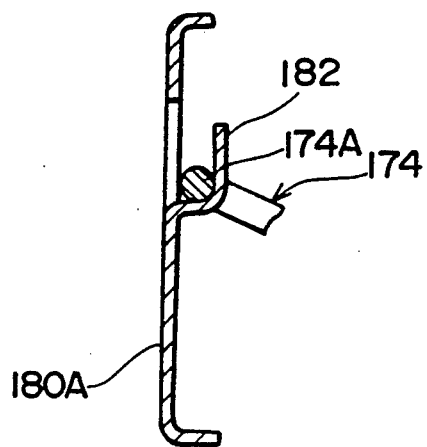
FIG. 15 is a cross-sectional view taken along line 15—15 of FIG. 14.

Furthermore, according to the present embodiment, no holes are formed in an outer wall surface of the seat back frame 112, unlike a configuration with a cut-out uprising portion for serving as a spring-interlocking portion 182, as shown in FIG. 14. Therefore, the seat back frame 112 can be designed to expose the outer wall surface thereof without detracting from a favorable appearance. In addition, according to the present embodiment, the seat back frame 112 is cast-formed, thereby allowing the spring-mounting seat 130 to be positioned freely and providing the woven spring member with an appropriate tensile force.

The present embodiment uses the seat back frame 112 of a high-back type which is provided with a head restraint portion 114. In lieu thereof, a low-back type seat back frame having a separable head restraint portion may also be used.

The above-described structure according to the present invention provides improved operations in which: the woven spring member can be combined more operatively with the seat back frame; and, spring-mounting members on the seat back frame can acquire increased strength.

What is claimed is:

1. A seat frame for a vehicle comprising:
   a front-lower arm;
   a rear-lower arm, which is formed of a material having greater tensile strength and compressive strength than said front-lower arm, said rear-lower arm being overlaid with said front-lower arm so as to be fixed jointly to said front-lower arm;
   a seat back frame, which is integrally cast-formed and is fixed to said rear-lower arm so as to support an occupant; and,
   a woven spring member, which is formed of elastic fibers and is secured to said seat back frame,
   wherein said seat back frame comprises:
      a vertical wall portion, which extends along a periphery of said seat back frame;
      a plurality of spring-mounting members which are disposed inside said vertical wall portion so as to engage with said woven spring member; and
      a reinforcing member, which connects said vertical wall portion and each of said spring-mounting members for reinforcing the spring-mounting members,
      a hole, which is used to mount said woven spring member on said seat back frame, being provided in said reinforcing member between said vertical wall portion and each of said spring-mounting members.

2. A seat frame for a vehicle according to claim 1, wherein a rear end portion of said front-lower arm is secured to a front end portion of said rear-lower arm by means of a rivet.

3. A seat frame for a vehicle according to claim 1, wherein said front-lower arm is a press-formed light metal product.

4. A seat frame for a vehicle according to claim 1, wherein said rear-lower arm is a press-formed iron plate product.

5. A seat frame for a vehicle according to claim 1, wherein said front-lower arm is formed by a pair of front-lower arm members, and said rear-lower arm is formed by a pair of rear-lower arm members,
   a front-reinforcing member being provided at a vicinity of a front end portion of said pair of front-lower arm members, and connecting said pair of front-lower arm members; and
   a rear-reinforcing member being provided at a vicinity of a rear end portion of said pair of rear-lower arm members, and connecting said pair of rear-lower arm members,
   wherein a lower frame member is formed by said front-lower arm, said rear-lower arm, said front-reinforcing member, and said rear-reinforcing member.

6. A seat frame for a vehicle according to claim 5, wherein said front-reinforcing member is bolted to said pair of front-lower arm members.

7. A seat frame for a vehicle according to claim 6, wherein one end of said front-reinforcing member is formed with a groove having a substantially U-shaped cross-section, a terminal end portion of a seat cover, which forms a covering for said vehicle seat, being fixed to said groove.

8. A seat frame for a vehicle according to claim 5, wherein said rear-reinforcing member is bolted to said pair of rear-lower arm members.

9. A seat frame for a vehicle according to claim 8, wherein one end of said rear-reinforcing member is formed with a planar surface having a thin cross-section, a terminal end portion of a seat cover, which forms a covering for said vehicle seat, being fixed to said planar surface.

10. A seat frame for a vehicle according to claim 1, wherein each of said spring-mounting members has an interlocking member which engages with said woven spring member.

11. A seat frame for a vehicle according to claim 10, wherein each of said spring-mounting members has a spring-mounting seat to which said interlocking member is mounted.

12. A seat frame for a vehicle according to claim 11, wherein said woven spring member has hooking members at opposite end portions thereof in a transverse direction of said woven spring member, each of said hooking members engaging with said spring-mounting seats.

13. A seat frame for a vehicle according to claim 11, wherein said reinforcing member is integrally formed with said vertical wall portion and said spring-mounting seat.

14. A seat frame for a vehicle according to claim 13, wherein said reinforcing member has said hole at a substantially central portion thereof.

15. A seat frame for a vehicle according to claim 11, wherein said spring-mounting seat has an interlocking member-mounting hole, said interlocking member being provided in said interlocking member-mounting hole so as to be freely engaged therein.

16. A seat frame for a vehicle comprising:

a seat back frame, which is cast-formed and is fixed to a rear-lower arm portion so as to support an occupant; and, a woven spring member, which is formed of elastic fibers and is fixed to said seat back frame, wherein said seat back frame comprises:
a vertical wall portion, which extends along a periphery of said seat back frame;
a plurality of spring-mounting seats, which are disposed inside said vertical wall portion and mount interlocking members to said spring-mounting seats, so that said woven spring member engages with said interlocking members; and,
a reinforcing member, which connects said vertical wall portion and each of said spring-mounting seats, for reinforcing said spring-mounting seats,
a hole, which is used to mount said woven spring member on said seat back frame, being provided in said reinforcing member between said vertical wall portion and each of said spring-mounting seats.

17. A seat frame for a vehicle according to claim 16, wherein said woven spring member has hooking members at opposite end portions thereof in a transverse direction of said woven spring member, said hooking members engaging with said interlocking members.

18. A seat frame for a vehicle according to claim 17, wherein said hooking members are a metal wire.

19. A seat frame for a vehicle according to claim 17, wherein said hooking members are sewed or welded to said woven spring member.

20. A seat frame for a vehicle according to claim 16, wherein said reinforcing member is integrally formed with said vertical wall portion and each of said spring-mounting seats, said reinforcing member having said hole at a substantially central portion thereof.

21. A seat frame for a vehicle according to claim 16, wherein each of said spring-mounting seats has an interlocking member-mounting hole, each of said interlocking members being provided in said interlocking member-mounting hole so as to be freely engaged therein.

* * * * *